United States Patent [19]

Bergman et al.

[11] Patent Number: 5,955,952
[45] Date of Patent: Sep. 21, 1999

[54] METHOD AND SYSTEM FOR LOCATING A LOST PERSON OR LOST PERSONAL PROPERTY

[75] Inventors: Derrick Bergman, Holmes Beach; James Harwood, Bradenton, both of Fla.

[73] Assignee: Sunset Advertising Enterprises, Inc., Holmes Beach, Fla.

[21] Appl. No.: 08/957,070

[22] Filed: Oct. 24, 1997

[51] Int. Cl.⁶ .............................. G08B 23/00; G08B 5/22; H04M 11/04; G07D 7/00

[52] U.S. Cl. ................................ 340/573.1; 340/573.4; 340/825.19; 340/825.49; 340/825.36; 340/825.34; 379/38; 379/45; 342/357; 342/457

[58] Field of Search ..................... 340/573, 539, 340/825.49, 825.54, 407.1, 825.19, 825.34, 825.36, 563; 379/38, 37, 45; 342/357, 457; 235/380; 128/690; 455/88, 38.4, 404

[56] References Cited

U.S. PATENT DOCUMENTS

| | | | |
|---|---|---|---|
| 5,021,794 | 6/1991 | Lawrence | 342/457 |
| 5,086,391 | 2/1992 | Chambers | 340/573 |
| 5,537,460 | 7/1996 | Holliday, Jr. et al. | 379/59 |
| 5,652,570 | 7/1997 | Lepkofker | 340/573 |
| 5,717,379 | 2/1998 | Peters | 340/539 |
| 5,731,757 | 3/1998 | Layson, Jr. | 340/573 |
| 5,742,233 | 4/1998 | Hoffman et al. | 340/573 |

*Primary Examiner*—Benjamin C. Lee
*Attorney, Agent, or Firm*—Arent, Fox, Kintner, Plotkin & Kahn, PLLC

[57] ABSTRACT

The present invention defines a method and system for identifying and locating a lost person or lost personal property. The invention makes use of a subscription service wherein individuals desiring the locating service may pre-register the individual or property. At registration, the subscribing individual provides personal information relevant to the individual or property to be tracked which is stored in a database. The subscribing individual is provided a photo identification card, unique to the individual, which includes a toll-free telephone number and unique Personal Identification Number (PIN) imprinted thereon. If the individual or property to be tracked becomes lost or misplaced, the lost individual or members of his family, or the subscribing individual who has lost his property, may call the toll-free number to report the individual or property as lost or misplaced. Through the PIN, an operator receiving the toll-free call may retrieve the individual's personal information or the information concerning the property. The personal information is used to assist law enforcement and emergency personnel in identifying, locating, tracking the individual or property.

8 Claims, 3 Drawing Sheets

METHOD AND SYSTEM FOR LOCATING A LOST PERSON OR LOST PERSONAL PROPERTY

BACKGROUND OF THE INVENTION

There is a great need for a system that facilitates identification of lost individuals or individuals in need of emergency assistance, particularly children, and the notification of the lost individual's parent/guardian/family members/medical professionals and/or local law enforcement personnel, as necessary. Almost a million persons per year are reported missing to the police and/or the FBI, and the FBI estimates that 85–90% of these persons are juveniles. And, these numbers have been continuously increasing for the past 13 years. Another difficulty with current means used to locate lost individuals is that ⅔ of the land area of the United States is not covered by 911 emergency service. Recovery of lost individuals is very difficult in those areas. Moreover, recovery of lost individuals is further complicated when families cannot supply investigators with up to date, detailed personal information concerning the lost individual. Authorities claim that when they are provided with proper, up-to-date personal information, such as a recent full face photograph and vital statistics, their chances of recovering a lost individual increase significantly.

There is also a need for a system which facilitates assistance to individuals who have a medical emergency, or who are injured, panicked and/or frightened. Again, the 911 service coverage area is incomplete. Moreover, even if an individual is within the 911 service area, it is difficult to get accurate information from an individual when that individual is in an emergency situation or is otherwise panicked or frightened. If medical information was already on file concerning an individual before an emergency situation arises, medical assistance could be more quickly provided and could be rendered more effectively.

Moreover, millions of dollars worth of personal property are stolen or lost every year. These losses serve to increase insurance costs nationwide, among other things. The invention facilitates the location and recovery of personal property, thereby decreasing such insurance claims.

SUMMARY OF THE INVENTION

It is accordingly, an object of the present invention to provide a system and method which facilitates the identification and location of a lost individual.

It is an additional object of the present invention to provide a system and method for the identification and location of a lost individual which provides law enforcement authorities with easy access to a recent full face photograph and vital statistics of the lost individuals to facilitate the location process.

It is a further object of the present invention to provide a system and method for the identification and location of a individual which includes a method to cross-notify the parents/guardians/family members of the lost individual.

It is an additional object of the present invention to provide a method and system of facilitating the rendering of medical assistance in emergency situations.

It is a further object of the present invention to provide a system and method which facilitates the identification and location of lost personal property.

Additional objects and advantages of the invention will be set forth in part in the description which follows, and in part will be obvious from the description or may be learned by practice of the invention. The objects and advantages of the invention may be realized and attained by means of the instrumentalities and combinations pointed out in the appended claims.

To achieve the objects and in accordance with the purposes of the invention, as embodied and broadly described herein, the method for locating a lost person of the invention comprises the steps of: (1) producing one or more personal identification cards having preassigned unique identifying indicia thereon, the preassigned unique identifying indicia including a unique personal identification number, a full face photograph of the person, and toll-free telephone number of a central station; (2) dispensing the personal identification card to the person and/or to the person's parent(s)/guardian (s)/family member(s) if desired; (3) reporting certain vital statistics and personal information concerning the person to whom the personal identification card was dispensed to the central station; (4) storing the reported certain vital statistics and personal information concerning the person and the full face photograph of the person in a database; (5) reading and calling the toll-free telephone number when the person becomes lost; (6) placing a call to the central station via the toll-free telephone number; (7) reporting the personal identification number to the operator at the central station; (8) utilizing a caller identification type service to obtain the phone number relating to the particular phone from which the call is placed to the central station; (9) correlating the obtained phone number to a particular geographic location from which the call is placed to the central station; (10) utilizing the personal identification number to facilitate retrieval of the certain vital statistics and personal information concerning the person and the full face photograph of the person from the database; (11) placing a call from the central station to the law enforcement authorities and providing the certain vital statistics and person information concerning the person to the law enforcement officials; (12) placing a call from the central station to the parent(s)/guardian(s)/family member(s) of the person informing the parent(s) guardian(s)/family member(s) that the person is lost; and (13) placing a call from the central station to medical personnel if the certain vital statistics and personal information concerning the person indicate that the person has a medical condition(s) which may necessitate medical attention.

The method for locating lost personal property utilizes similar steps as the afore-described method with the exception of notification of medical personnel.

The accompanying drawings, which are incorporated in and constitute a part of this specification, illustrate one embodiment of the invention and, together with the description, serve to explain the principles of the invention.

DESCRIPTION OF THE PREFERRED EMBODIMENT

Figure 1:
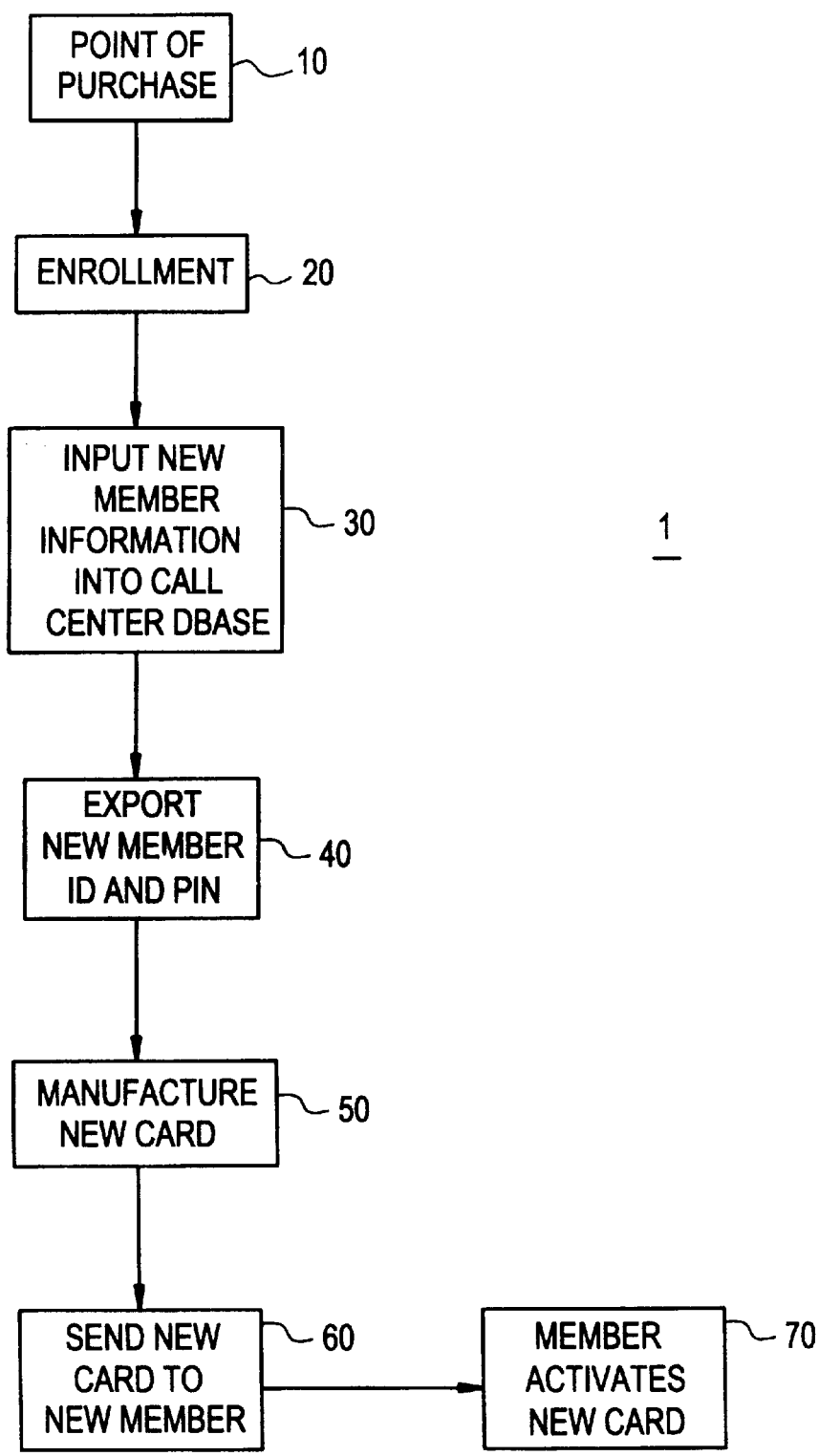
FIG. 1 is a flowchart illustrating the steps involved in subscription to the locating service of the present invention.

Reference will now be made in detail to the presently preferred embodiment of the invention, an example of which is illustrated in the accompanying drawings in which like reference characters refer to corresponding elements.

FIG. 1 illustrates the steps taken to subscribe to the location service of the present invention. The service can be marketed through photographers who came to local schools to take school portraits. The service can also be marketed through retail portrait studios and retail photo development outlets. Additionally, the service can be marketed via the Internet or through mail order brochures.

A nonmember who is interested in subscribing may receive materials at these various outlets, as shown in step 10. In step 20, the nonmember will be required to complete an enrollment form. The enrollment form will request information relating to the person or item of property which is to be enrolled. In the case of a person, the subscriber will provide the person's name, social security number, address, phone number, age, physical disabilities, allergies or medications, personal physical information and description of person's appearance (height, weight, color of hair and eyes, etc.); the name(s), addresses(es) and phone number(s) of person(s) to be contacted for emergency and nonemergency situations (such as parents, doctors, other family members, nearby neighbors, etc.). Additionally, a full face photograph will be required if the location service is to be used in connection with tracking a specific person.

Next, in step 30, the information from the new member's enrollment form is input into a centralized database which will be located at a centralized call center. Also included in this database will be phone numbers for law enforcement agencies which will be grouped by geographic location.

In step 40, a new member identification number (ID) and unique personal identification number (PIN) is assigned to the person or property which was just enrolled. This new ID and PIN number will be transmitted with the full face photograph and identification information concerning the new member to a plastic card manufacturer/fulfillment agency which, in step 50, manufactures a card. The card will include a specially-coded magnetic strip for storing encoded information concerning the new member, such as the new member's PIN. This magnetic strip will be compatible with credit-card accessible phones. The card will also include the photograph of the new member, and the new member's name. Additionally, it will include imprinted thereon a toll-free phone number which the new member may call in the event he/she becomes lost or is involved in an emergency situation. The toll-free number connects the new member with the centralized call center for the location service. Finally, the card will be compatible with the Automated Number Identification service which provides the receiving line an identification of the phone number from which a caller is making the call. This feature is useful in tracking lost persons.

In step 60, the new card, a new member profile (including the information from the enrollment form) and identification stickers for us in clothing and/or property are sent from the fulfillment service to the new member. The new member must verify the accuracy of the information on the profile and the PIN before he/she is able to access the service, as shown in step 70. Once verification is received, updates/modifications to the information can be made, if needed.

Figure 2:
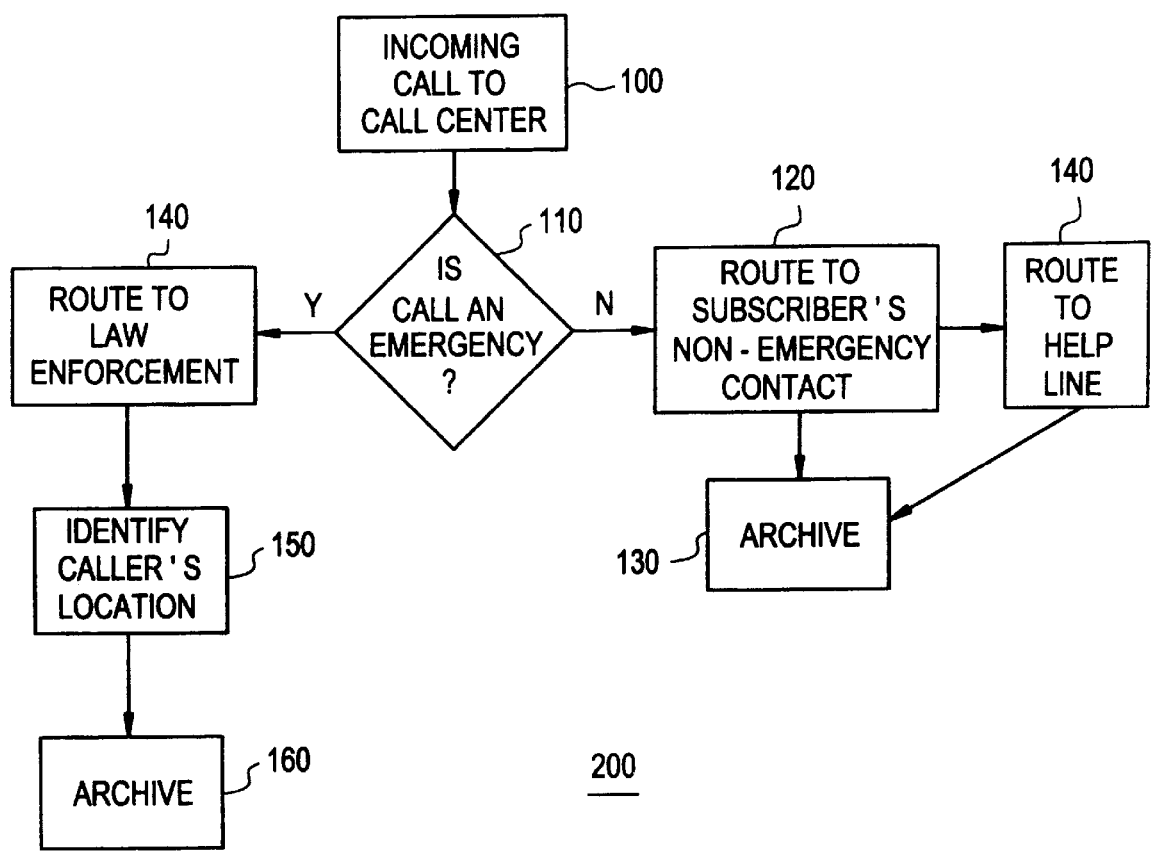
FIG. 2 is a flowchart illustrating the steps included in the method for locating a lost person of the present invention.
Figure 3:
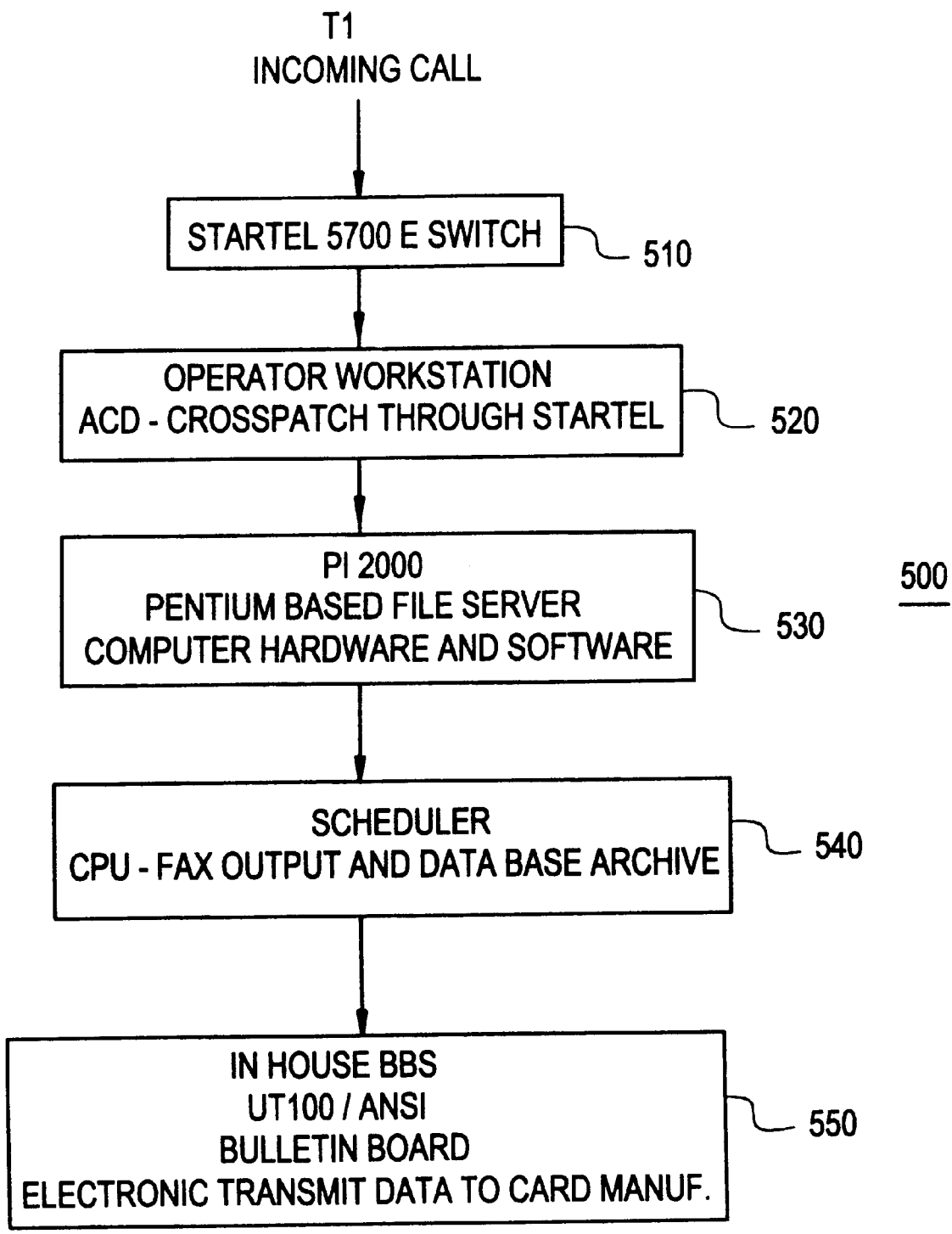
FIG. 3 is a block diagram illustrating the components of the call center for the system of the present invention.

As shown in FIGS. 2 and 3, when a member becomes lost or is found in an emergency situation, he/she may call the toll-free telephone number on the card. The call may be placed via regular telephone, cellular phone or by pager. This will connect the member with the centralized call center. The call center will be operated on a 24 hour/7 day per week basis with live operators. At step 100, the incoming call is routed through the telephone switch 510. The call is transmitted to the call center's automatic call distributor (ACD) 520 which sends the incoming call to an operator. All calls are recorded so there are no possibilities of inaccurate data. The caller's PIN and ID will be displayed on the operator's monitor at the operator's workstation. The operator will ask the caller to verify his/her PIN to ensure to whom the operator is talking. The operator will ask the caller if the caller is in an emergency situation as shown in step 110. Simultaneously, the operator will input the caller's PIN into the operator's terminal/computer which will retrieve the caller's personal profile information from the database. A pentium-based file server 530 may be used for the computer hardware/software required for storing the profile information and for processing of input information. Included in the information retrieved from the database will be a digital photograph of the caller (the same photo as appears on the member's card). Once the operator determines that the caller is in an emergency situation, and the caller's location is determined from the ANI service, the operator retrieves information from the database relating to the appropriate law enforcement authorities or medical personnel depending on the caller's location and/or the caller's personal profile information. As shown in step 140, the operator will notify the appropriate law enforcement/medical personnel and transmit via data link the personal profile information (including the digital photo) and the information relating to the caller's location (step 150). The operator can also contact other individuals as indicated on the member's personal profile.

If the caller is not in an emergency situation, the operator will instead contact the non-emergency contact person(s) identified on the caller's personal profile as shown in step 120. The call can then be routed to a help or counseling line as shown in step 140.

Information relating to all calls placed to the call center is archived as shown in steps 130 and 160.

The call will be terminated only when the member has been assured that assistance is complete and/or upon arrival of local law enforcement agencies to the member's call location (once the caller's calling location has been secured by local law enforcement agencies).

Additional services may also be provided. The service can operate a 900 phone number. This number can be used (instead of the emergency phone number) for the member's access to his/her individual personal profile information. The service can allow the member, after entry of his/her PIN, to change his/her personal profile information via the phone. This number can also be used as the contact number for ordering additional or replacement cards if a member loses his/her card. Additionally, for lost individuals the photograph from the member's personal profile may be used to post on a World Wide Web page on the Internet. Since the Internet is becoming a more widely-used medium for communication, it represents another potential source for assistance in trying to locate a lost individual.

The location service may also provide drug/alcohol abuse hotlines, counseling services via telephone, a suicide prevention hot line and travelers' assistance, among other services.

Additionally, if a member wishes to place a long distance or local telephone call, he/she can do so using the service. The operator at the call center can assist the member. The member may then be billed for the costs of the call.

It will be apparent to those skilled in the art that various modifications and variations can be made in the method and system of the present invention without departing from the scope or spirit of the invention. Thus, it is intended that the present invention cover the modifications and variations provided they come within the scope of the appended claims and their equivalents.

What is claimed is:

1. A method for locating a lost person, comprising the steps of:
   (a) producing one or more personal identification cards having preassigned unique identifying indicia thereon, the preassigned unique identifying indicia including a unique personal identification number, a full face photograph of the person, and a toll-free telephone number of a central station;
   (b) dispensing the one or more personal identification cards to the person and/or to the person's parent(s)/guardian(s)/family member(s) if desired;
   (c) reporting certain vital statistics and personal information concerning the person to whom the personal identification card was dispensed to the central station;
   (d) storing the reported vital statistics and personal information concerning the person and the full face photograph of the person in a database;
   (e) reading and calling the toll-free telephone number when the person becomes lost;
   (f) placing a call to the central station via the toll-free telephone number;
   (g) reporting the personal identification number to the operator at the central station;
   (h) utilizing a caller identification type service to obtain the phone number relating to the particular phone from which the call is placed to the central station;
   (i) correlating the obtained phone number to a particular geographic location from which the call is placed to the central station;
   (j) utilizing the personal identification number to facilitate retrieval of the certain vital statistics and personal information concerning the person and the full face photograph of the person from the database;
   (k) placing a call from the central station to law enforcement authorities and providing the certain vital statistics and personal information concerning the person and the full face photograph of the person to the law enforcement authorities;
   (l) placing a call from the central station to the parent(s)/guardian(s)/family member(s) of the person informing the parent(s)/guardian(s)/family member(s) that the person is lost; and
   (m) placing a call from the central station to medical personnel if the certain vital statistics and personal information concerning the person indicate that the person has a medical condition(s) which may necessitate medical attention.

2. The method for locating a lost person as claimed in claim 1, further comprising the step of: placing a tag including the unique personal identification number and the toll-free telephone number on an item of clothing worn by the person to further assist with the location of the person particularly when the person is incapacitated and is unable to place a call to the toll-free telephone number themselves.

3. The method of locating a lost person as claimed in claim 1 wherein the central station is operated on a 24-hour a day basis for seven days of a week.

4. The method of locating a lost person as claimed in claim 1, wherein said step of reading and calling the toll-free telephone number is replaced with the step of: swiping the personal identification card through a magnetic-stripe-reading-apparatus-equipped telephone to automatically initiate the call to the toll-free telephone number when the person becomes lost.

5. The method of locating a lost person as claimed in claim 1, wherein said preassigned unique identifying indicia of said one or more personal identification cards include an electronic mail address and a facsimile telephone number of the central station.

6. The method of locating a lost person as claimed in claim 5 wherein said step of placing a call to the central station is replaced by the step of: sending an electronic mail communication to the central station via the electronic mail address.

7. The method of locating a lost person as claimed in claim 5 wherein said step of placing a call to the central station is replaced by the step of: sending a facsimile transmission to the central station via the facsimile telephone number.

8. A method for locating lost personal property, comprising the steps of:
   (a) producing one or more property identification cards having preassigned unique identifying indicia thereon, the preassigned unique identifying indicia including a unique property identification number, a photograph of the personal property and a toll-free telephone number of a central station;
   (b) dispensing the property identification card to the owner of the property;
   (c) reporting certain identifying information concerning the personal property for which the property identification card was dispensed to the central station;
   (d) storing the reported certain identifying information concerning the personal property and the photograph of the personal property in a database;
   (e) reading and calling the toll-free telephone number when the personal property becomes lost;
   (f) placing a call to the central station via the toll-free telephone number;
   (g) reporting the property identification number to the operator at the central station;
   (h) utilizing a caller identification type service to obtain the phone number relating to the particular phone from which the call is placed to the central station;
   (i) correlating the obtained phone number to a particular geographic location from which the call is placed to the central station;
   (j) utilizing the property information number to facilitate retrieval of the certain property and the photograph of the personal property from the database; and
   (k) placing a call from the central station to law enforcement authorities and providing the certain identifying information concerning the personal property and the photograph of the personal property to the law enforcement authorities.

* * * * *